United States Patent [19]

Edwards et al.

[11] 4,080,294

[45] Mar. 21, 1978

[54] FILTRATION SYSTEM

[75] Inventors: James H. Edwards, Winchester; Bernard R. Danti, Lexington, both of Mass.; Wayne S. Merrill, Nashua, N.H.

[73] Assignee: Millipore Corporation, Bedford, Mass.

[21] Appl. No.: 753,961

[22] Filed: Dec. 23, 1976

Related U.S. Application Data

[63] Continuation of Ser. No. 565,095, Apr. 4, 1975, abandoned.

[51] Int. Cl.$^2$ .................. B01D 31/00; C02B 3/02
[52] U.S. Cl. .................. 210/232; 211/13; 210/321 R; 210/351; 210/398; 210/433 M; 210/436; 210/450; 210/451; 210/453; 210/454; 210/455; 210/472; 210/483
[58] Field of Search ............ 210/450, 494, 350, 158, 210/433 M, 232, 500 M, 308, 309, 436, 23, 321 R, 321 B, 321 A, 351, 398, 451, 453, 454, 455, 472, 483; 211/13, 1, 60 R; 248/359; 269/47, 48.1

[56] References Cited

U.S. PATENT DOCUMENTS

| | | | |
|---|---|---|---|
| 2,754,005 | 7/1956 | Tursky | 210/450 |
| 3,457,170 | 7/1969 | Havens | 210/23 |
| 3,542,204 | 11/1970 | Clark | 10/321 |
| 3,578,175 | 5/1971 | Manjikian | 210/489 |
| 3,774,771 | 11/1973 | Manjikian et al. | 210/321 |

FOREIGN PATENT DOCUMENTS

| | | |
|---|---|---|
| 979,954 | 3/1962 | United Kingdom. |
| 1,149,408 | 4/1969 | United Kingdom. |
| 1,407,298 | 9/1975 | United Kingdom. |

Primary Examiner—Frank Sever
Attorney, Agent, or Firm—Irons and Sears

[57] ABSTRACT

A filtration system is provided that directs a fluid to be filtered through a disposable tubular filtration element, supports the filtration element, and accommodates for "wet growth" of the filtration element. The system operates with an inside-to-outside forced fluid flow through the filtration element and includes a generally cylindrical housing with a fluid inlet and outlet. A perforated outer support screen is mounted within the housing and surrounds the walls of the tubular filtration element with slight clearance. Under the influence of the fluid pressure and the wet growth, the walls of the filtration element bear against the screen. A sealing and support assembly having upstream and downstream fluid guides, each carrying, in a preferred form, a pair of resilient sealing members, is positioned inside the filtration element. A rigid inner member bridges the opposing faces of the resilient member pairs. A rod and nut arrangement draws the flow guides towards one another to apply a longitudinal compressive force on the resilient members caught between a flange on the flow guides and the rigid inner member. This compressive force deforms the resilient members in a radially outward direction to seal the filtration element to the housing and isolate the filtered fluid. In a preferred form, the adjacent faces of each pair of resilient members are aligned with the interior edge of an impregnated end portion of the filtration element. In addition, a tubular prefiltration element may be positioned inside the rigid inner member.

21 Claims, 5 Drawing Figures

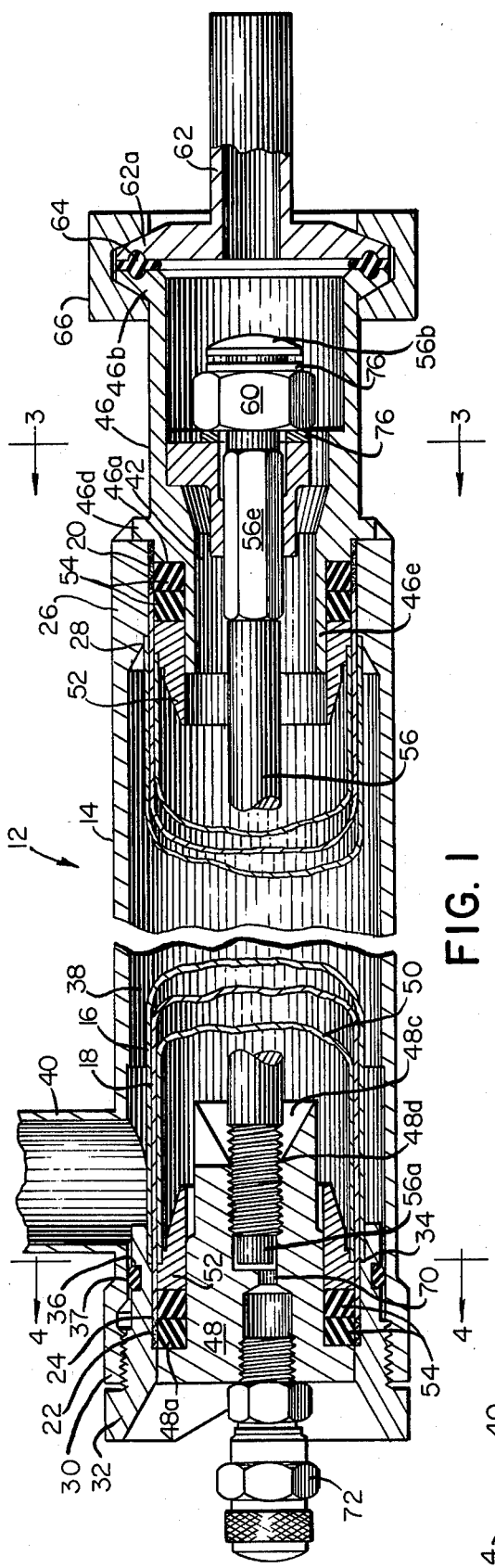

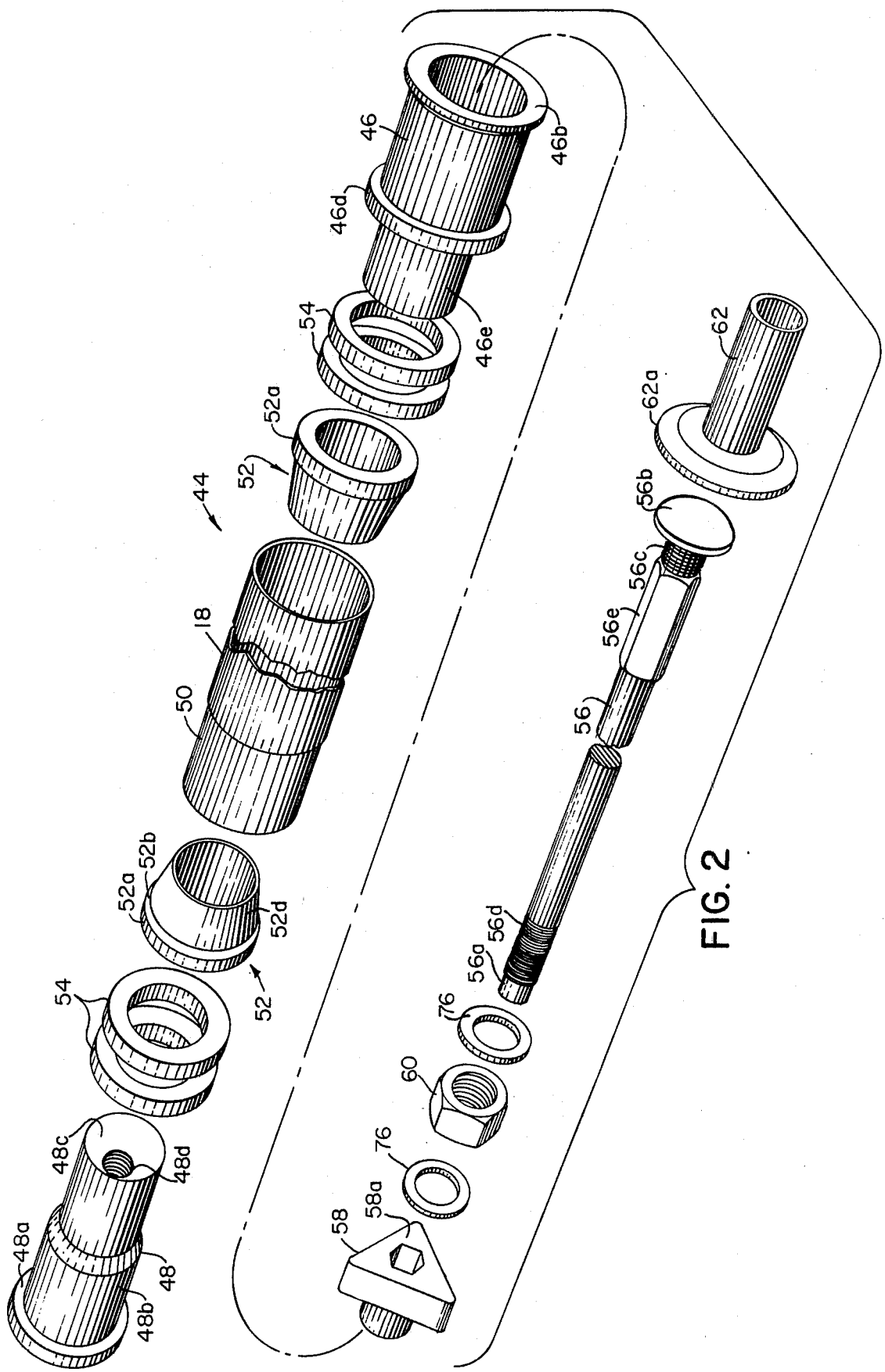

FILTRATION SYSTEM

This is a continuation, of the application Ser. No. 565,095, filed Apr. 4, 1975 now abandoned.

BACKGROUND OF THE INVENTION

This invention relates in general to filter holders and filter systems, and more specifically to systems utilizing disposable tubular filtration elements with an inside-to-outside forced fluid flow.

In most filtering processes, it is necessary to support the filter medium, to direct an unfiltered fluid flow toward one surface of the filter medium and to direct the filtered fluid away from another surface of the medium. The need for support is particularly acute when the filter medium is a thin layer of material such as a membrane filter, or when the unfiltered fluid is under an applied pressure to promote or speed the filtering process. To direct the fluid flow to and from the filter medium, it is known to mount a filter medium within a housing so that the filter separates two fluid zones or reservoir chambers, one through which the unfiltered fluid passes and the other through which the filtrate passes. The construction of the housing and the nature of the reservoir chambers and mounting arrangements have taken a wide variety of forms depending on such factors as the shape and characteristics of the filter medium, and degree of the applied pressure, the desired flow rate, characteristics of the fluid, and convenience in periodically replacing the filter. To support fragile filter media, particularly under high applied pressures, it is also known to place a mechanically strong support layer against the downstream side of the filter medium. Common supports include wire meshes and apertured layers of various structural materials.

To enhance the mechanical strength of the filter medium and to provide a relatively large filter surface in a compact form, it is common to wrap a sheet of filter medium into a tubular form. Filter elements of this design, and associated supports layers and holders, are common in the field of reverse osmosis filtering such as water desalinization and fluid concentration where the applied pressure is typically in the range of hundreds of psi. U.S. Pat. No. 3,578,175 to Manjikian is representative of such reverse osmosis filters and employs a hollow perforated core of a structural material which is wrapped with the filter membrane and other supportive or protective layers. The inner core provides downstream support for the filter layer with an outside-to-inside fluid flow direction. U.S. Pat. No. 3,744,771 to Manjikian discloses a suitable filtration system for mounting these tubular reverse osmosis filters with the outside-to-inside flow direction. Another type of tubular reverse osmosis filter is described in U.S. Pat. No. 3,457,170 to Havens which utilizes an inside-to-outside flow direction with a resin-impregnated outer support layer enclosing the filter media.

None of these conventional filtration systems, however, are adapted to operate with a disposable tubular filtration element of the type disclosed in a commonly assigned, co-pending U.S. application Ser. No. 565,094, filed of even date herewith by Merrill et al, the disclosure of which is hereby incorporated by reference. As there described, these filtration elements have a laminate construction in which an intermediate layer is formed from a microporous filtration material that removes all particulate matter and bacteria having dimensions in excess of a predetermined size from a fluid flowing through the material. A significant characteristic of the filtration material is that it exhibits a growth in volume of approximately 6% when it is wet (commonly termed "wet growth"). Another significant characteristic of the filtration material is that it is highly fragile and must be extremely well supported when in use, particularly when there is an applied pressure differential across the material. Filtration systems utilizing such elements must therefore provide good downstream support while accommodating the wet growth. In addition, the wet growth must be accommodated in a manner which reduces or eliminates any flexing or bending of the filtration medium since the mechanical stress of these movements can readily weaken or rupture the medium and thereby destroy its effectiveness as an absolute filter.

Downstream support and wet growth accommodation are especially significant when the filtration system is used to remove bacteria from the fluid and thereby "cold" sterilize it. In such applications, there are significant cost and convenience advantages in the capability of in-line sterilization of the filtration system itself, which involves the passage through the system of steam at a temperature in excess of 121° C at pressures of 15 psi. Conventional filter systems are inadequate in that an outside-to-inside pressurized fluid flow wrinkles, and therefore weakens or ruptures, the wet growth expanded filtration material. Also, the differential expansion of dissimilar materials, when steam sterilized sometimes results in fracture of the filter material. Of the few inside-to-outside flow filter systems known in the art, none are adapted to simultaneously accommodate an outward wet growth expansion while at the same time providing the necessary downstream support. Further, conventional filter systems are in general not adapted to operation under aseptic conditions commonly associated with microporous filtration elements, and, in particular, these systems are not designed to allow a fast and reliable replacement of spent filtration elements with fresh filtration elements or a rapid and convenient disassembly and reassembly of the filtration system for periodic, thorough cleaning and autoclaving.

It is therefore a principal object of our invention to provide a filtration system that utilizes a disposable tubular filtration element with an inside-to-outside forced fluid flow and which provides good downstream support for the filtration element while accommodating for its wet growth without subjecting it to mechanical stresses which would weaken or rupture the filtration medium.

Another object of the invention is to provide a filtration system for the removal of bacteria from a fluid which is in-line steam sterilizable.

Still another object of the invention is to provide a filtration system in which it is convenient to load and unload the filtration elements under aseptic conditions.

Still another object of the invention is to provide a rugged and compact filtration system which is readily installed in a production line, readily disassembled and reassembled once installed, and has a relatively low cost of manufacture.

Other and further objects of our invention will in part be obvious and will in part appear hereinafter.

SUMMARY OF THE INVENTION

A filtration system constructed according to our invention has a generally cylindrical housing formed with inlet and outlet means. Mounted within the housing is a generally cylindrical, perforated outer support screen. The support screen is mounted so that at least a portion thereof is spaced from the housing walls to thereby form a downstream reservoir chamber for the filtered fluid. A disposable tubular filtration element is positioned interior of the support screen. The filtration element has impregnated end portions that block the passage of fluid or contaminants through this portion of the filter. A slight clearance between the filtration elements and the screen allows the filtration element to slide into the screen without abrading the exterior surface of the element. In operation, or during in-line steam sterilization, the applied fluid pressure and the wet growth of the filtration material cause the filtration element to come into contact with the support screen, which provides a filter support.

An internal assembly that slides within the filtration element seals and supports the ends of the element while facilitating the desired inside-to-outside fluid flow and reliably isolating the filtrate from the unfiltered fluid. The internal assembly includes a pair of fluid guides bridged at their outer edges by a rigid, perforated support member, preferably a screen, and joined by a rod member secured to one fluid guide and journaled in the other. The "upstream" fluid guide, in fluid communication with the housing inlet, has interior fluid passages that direct the unfiltered fluid to the interior of the inner screen and the filtration element. The "downstream" support has no fluid passages except a vent path. A nut threaded on one end of the rod member is positioned to draw the fluid guides towards one another when it is tightened.

A resilient member, or preferably a pair of resilient members, is positioned on each flow guide between a flanged portion of the flow guide and near end of the inner screen. In a preferred form the inner screen bears against the resilient members through a flange on a support member adjacent the resilient members having a tapered portion extending into the screen.

When the sealing and support assembly is fully inserted within the filtration element, tightening the nut generates a longitudinal compressive force on the resilient members which deforms them in a radially outward direction to seal the ends of the filtration element to the housing. To replace a spent filtration element, the nut is loosened, and the assembly and the element readily slides out of the housing. A tubular prefiltration element may be positioned inside the inner screen, its ends being wedged between the inner screen and the tapered portion of the inner screen support. The resilient members are preferably, although not necessarily, square section O-rings positioned with respect to the filtration element so that the adjoining faces of the O-rings are aligned with the interior edge of the impregnated end portions of the filtration element.

These and other features and objects of the invention will be more fully understood from the following detailed description of our invention which is to be read in conjunction with the accompanying drawings.

BRIEF DESCRIPTION OF THE DRAWINGS

FIG. 1 is a fragmentary foreshortened view in vertical section of a single tube filtration system constructed according to the invention, partly broken away;

FIG. 2 is an exploded perspective view of a sealing and support assembly for use in a filtration system constructed according to the invention;

FIG. 3 is a sectional view taken along the line 3—3 of FIG. 1;

FIG. 4 is a sectional view taken along the line 4—4 of FIG. 1; and

FIG. 5 is a detailed fragmentary view, in section, of the sealing arrangement in FIG. 1.

DETAILED DESCRIPTION OF THE PREFERRED EMBODIMENTS

FIG. 1 shows a filtration system indicated generally at 12 having a generally cylindrical housing 14 that mounts a perforated outer support member or screen 16. A disposable tubular filtration element 18 is disposed within the outer screen 16 and the end portions 20 and 22 of the element 18 are impregnated with a material that does not pass the fluid being filtered. The filtration element 18 is preferably of the type described in detail in the commonly-assigned, co-pending U.S. application Ser. No. 565,094, filed of even date herewith by Merrill et al. It is significant for the purpose of fully understanding the invention to note that the filtration element 18 preferably has a laminate construction of an inner support layer, an intermediate layer of a microporous filtration material, and preferably an outer layer of a material which has a fine pore structure and does not shed particles or other contaminants into the filtered fluid. Microporous filtration materials of the proper grade have the capability of reliably removing all bacteria from a fluid passed therethrough. Most microporous filtration materials exhibit characteristic high fragility, poor strength under mechanical stresses such as bending or flexing, and a volume expansion when wet by a liquid, commonly termed "wet growth".

Another significant aspect of the filtration element 18 is that it can be bubble-point tested to determine the integrity of the microporous material layer before and after it has been used for filtration. The bubble point tests the capillary resistance of the fluid held in the pores of the filtration material by applying a known gas pressure to one side of the material until bubbles appear in a liquid held against the other side. The interface 24 between the end portions 20 and 22 and the body of the element 18 may be hydrophobic, or "non-wettable", and hence, since the filter capillaries do not contain liquid, they do not offer the required resistance to the gas pressure. It is therefore desirable that a suitable filtration system employing the element 18 have some arrangement for isolating this interface so that the filter system may be integrity-tested by bubble pointing.

For the purposes of this description, the inlet end of the housing 14 will be generally referred to as "upstream" or "upper" and the end proximate the outlet conduit, identified by the reference character 40 in FIG. 1, will be termed "downstream" or "lower" even though the location of the inlet and outlet passages is not restricted to the positions shown in FIG. 1 and the actual fluid flow does not necessarily proceed directly from the inlet to the outlet (a right to left direction as shown). Further the housing may be used in a horizontal position or with the inlet end below the outlet end. The housing 14, manufactured from any suitable structural material such as stainless steel, includes an upper end portion 26 of a slightly reduced inner diameter. A shoulder 28 formed on the inner surface of the end portion 26 is adapted to receive the upper end of the outer screen 16. At its lower end, the housing includes an end portion 30 with a slightly enlarged inside diameter having a t eaded interior surface. A generally ring-shaped removable outer screen support 32 is threaded into the housing end portion 30. A shoulder 34 formed on the inwardly projecting edge of the removable support 32 is adapted to receive the lower end of the outer screen 16. A circumferential groove 36 is formed on the outer surface of the removable support 32 to hold on O-ring 37 that blocks the passage of the fluid out of a downstream reservoir chamber 38 defined by the screen 16 and the housing 14. When the outer screen support 32 is removed, the outer screen 16 readily slides out of the housing. A conduit 40 attached to the housing 14 and in fluid communication with the downstream reservoir chamber 38 provides a suitable fluid outlet. The housing inlet 42 is located at the upper end of the housing and is formed by a combination of members described in more detail below.

The outer screen 16 is preferably a generally cylindrical tube of suitable structural material that is perforated by a pattern of closely spaced holes. Screens of 0.012 inch thick stainless steel having circular holes with a diameter of approximately 1/32 inch have been found to provide excellent mechanical support for the fragile filtration element 18, particularly when the element is wet and under an applied fluid pressure of up to 100 psi, while offering no appeciable flow resistance to the filtered fluid leaving the filtration element 18. The filtered fluid in the downstream reservoir 38 flows to the outlet conduit 40 under the force of the applied fluid pressure at the inlet.

A removable sealing and support assembly 44, shown in an exploded view in FIG. 2 and in a sealed condition within the housing 14 in FIG. 1, is positioned inside the tubular filtration element 18. When the assembly is fully inserted within the filtration element and placed in a sealing condition (FIGS. 1 and 5), it compresses and seals the ends 20 and 22 of the filtration element to the inner surfaces of the housing. The assembly also establishes the desired inside-to-outside fluid flow through the filtration element, while isolating the filtered from the unfiltered fluid.

The sealing assembly generally indicated at 44 in FIG. 2 has an upstream fluid guide 46 and a downstream fluid guide 48 which are separated from each other by a rigid inner screen 50. A pair of inner screen support members 52, carried on the exterior surfaces of the fluid guides 46 and 48, supports the inner screen 50 at its ends. A pair of resilient members 54, carried on each flow guide is sandwiched between the flange 46a (FIG. 1) or 48a formed on the flow guides 46 and 48, respectively, and the flange 52a formed on the inner screen support 52. The flow guides 46 and 48 are also connected by a central rod 56 having one end secured in the downstream flow guide 48 and having the other end journaled within the upstream flow guide 46 by means of an adapter 58 that is keyed to both the rod 56 and the flow guide 46. A nut 60, threaded on one end of the rod 56, is positioned to bear against a transverse face 58a of the adapter.

The upstream flow guide 46 has a generally hollow tubular configuration of varying internal and exterior diameters. Beginning at its right-hand end, as shown in FIG. 1, the flow guide has a flange 46b adapted to mate with a corresponding flange 62a formed on the fluid inlet conduit 62. An O-ring 64 seated in opposed circular grooves formed in the flanges 46b and 62a provides a fluid-tight seal between these elements. A split ring clamp 66 secures the inlet conduit to the upstream fluid guide 46. Near the mid-point of the flow guide 46 its internal diameter reduces first in a step fashion and then in an inwardly tapering fashion. The step portion, as best shown in FIG. 3, has three locating notches 46c, which receive and key the generally triangular shaped adapter 58 to the flow guide 46. This mounting arrangement provides fluid passage in the areas 68 between the upstream flow guide and the sides of the adapter 58.

A flange 46d is formed on the flow guide's outer surface near the end of the inwardly tapering section. This flange abuts the housing end-portion 26 and thereby locates the flow guide 46 as well as the assembly 44 with respect to the housing 14. The left-hand portion 46e of the flow guide 46 extends within the housing end portion 26 and has a substantially reduced, uniform outer diameter. This inwardly projecting portion provides the mounting surface for the resilient members 54 and one of the inner screen supports 52.

The downstream or lower fluid guide 48 is a generally cylindrical member having a stepped outer surface. The flanged portion 48a is located at its outer or left-hand end; it has an outer diameter that fits closely within the removable outer screen support 32. The surface 48b (FIG. 2), adjacent the flange portion, is of substantially uniform outside diameter; it carries the resilient members 54 and the other lower inner screen support 52. At the inner or right-hand end of the flow guide 48 a portion of still further reduced outside diameter has a countersunk end surface 48c adapted to direct one end of the central rod 56 to a threaded bore 48d where it is secured.

At the bottom of the bore 48d, there is an annular clearance between the tip portion 56a of the rod 56 and the wall of the bore. This clearance produces a fluid path, via an internal passage 70, to a vent valve 72 threaded in the outer end of the fluid guide 48. The vent valve 72 and the passage 70 are off center with respect to the rod 56 and the bore 48d (as shown in both FIGS. 1 and 4) so that in the position illustrated, trapped gases flowing from the bore 48d will vent under the influence of internal pressure to the passage 70 and the vent valve 72.

The inner screen supports 52 are collar-like members having a substantially uniform inside diameter that slides over the appropriate seating surface on the flow guides 46 and 48. The flanges 52a at one end of each of the supports have a face area that corresponds closely to that of the flow guide flanges 46a and 48a. The flanges 52a terminate in a sharp cornered shoulder 52b (FIG. 5) that holds one end of the inner screen 50. Dimensions of the shoulder are such that the outer surface of the screen 50 and the outer surface of the support flange 52a are spaced closely from the inner surface of the filtration element 18. A second shoulder 52c, having a further reduced outer diameter, is adapted to receive an end of a tubular pre-filtration element 74 of conventional construction (shown in FIG. 5, but not in FIG. 1 for reasons of clarity.) An inwardly tapered outer surface 52d guides the pre-filtration element 74 to the shoulder 52c and assists in jam-sealing the element 74 at its ends to the inner screen 50.

The inner screen 50 is similar to the outer screen 16 in that it is a perforated cylindrical structure of a suitable structural material such as stainless steel. The perforations are preferably circular holes approximately 1/16 inch in diameter. A closely spaced pattern of such holes provides good support for both the pre-filtration element during normal operation and for the filtration element 18 during any back-pressure situation which sometimes occurs. It should be noted that the screen 50 represents the preferred form of the invention, but that its function in clamping the resilient members can be performed by alternative rigid structures such as a plurality of radially spaced, longitudinally extending members fixed at their ends to flanges bearing against the resilient members.

The rod 56 has a head 56b at its upstream end, upstream and downstream threaded portions 56c and 56d, respectively, and an hexagonally shaped section 56e located proximate the threaded portion 56c. The diameter of the section is such that the nut 60 can slide over the threaded portion 56d and the hexagonal portion 56e and thread onto the portion 56c. Washers 76, positioned on both sides of the nut, facilitate the nut's travel along the section 56c as it is turned, particularly when the nut is tightened against the face 58a of the adapter to draw the flow guides 46 and 48 together. Although a rod and nut arrangement are preferred for drawing the flow guides together, it will be understood that alternative mechanical arrangements can be used to achieve the desired movement without departing from the scope of the invention.

The resilient members 54 are rings of deformable material that establish an excellent seal and do not deteriorate or contribute contaminants to the fluid being processed. Standard silicone rubber O-rings have been found suitable. Square section O-rings are preferred since they offer an increased sealing area with the adjacent rectilinear structure surfaces than the more common circular section O-rings.

Sealing of the ends of the filtration element 18 is accomplished by the action of the O-rings 54 as the nut 60 is tightened and the flow guides are drawn together. Since the inner screen prevents the inner screen supports 52 from moving towards one another, the relative movement of the flow guides generates a compressive force on the resilient members caught between the flow guide flanges 46a and 48a and the inner screen support flanges 52a. Because of their inherent resiliency, the members 54 deform in a radially outward direction in response to this compressive force. This outward deformation squeeze-clamps the ends of the tubular filtration element 18 between the members 54 and the surrounding housing portions 26 and 32. This squeeze-clamping provides the desired reliable seal against the passage of the fluid being processed.

Since the interior edge or interface 24 of the impregnated end-portions 20 and 22 may be hydrophobic, it is desirable that the interface be sealed from the fluid and test gases by the resilient members 54 in order to preserve the bubble point capability of the system. Although this may be accomplished by a single resilient member that overlies the interface, the sealing action of the member will produce a differential compression between the impregnated end-portion and the unimpregnated body of the element 18. This compression differential can, in turn, cause a lateral stress on the filter layers which can weaken or rupture the fragile filtration layer and thus destroy the effectiveness of the entire system. It is therefore recommended that the sealing force of the resilient member on either side of the interface 24 have a corresponding differential. This can be accomplished by using a single resilient member that has a discontinuity in its shape or its characteristic resiliency at a point adjacent the interface. A preferred method, illustrated and described herein, is to use a pair of resilient members with each bearing on only one side of the interface. A proper choice of the dimensions or resiliency of the members 54 can then result in a minimal stress on the microporous filtration layer of the filter element 18.

The component parts of the filtration system 14 described are readily assembled or disassembled into either individual parts or groups of parts as follows. An "outer" housing group is assembled by sliding the outer screen into the housing through the downstream end 30 until it seats on the shoulder 28. The replaceable outer screen support 32 then threads into the housing end 30 to firmly mount the downstream end of the outer screen 16 while establishing the desired spatial relationship between the outer screen and the housing. A fresh disposable filtration element 18 then slides into the housing until its end 20 is flush with the outer edge of the housing end-portion 26.

The sealing and support assembly 44 is assembled "skewer" fashion on the central rod 56. First, one of the washers 76 slides the length of the rod until it rests against the rod head 56b. The nut 60 is then threaded onto the rod until it engages the threaded rod section 56c. It is followed by another washer 76 and the adapter 58 which has a central longitudinal hexagonal passage that is keyed to the hexagonal rod section 56e.

The upstream flow guide is then seated on the adapter 58 with its internal notches 46c mating with the corners of the adapter 58. The rod, adapter and outer housing are thus keyed to one another to prevent the rotation of the rod 56 as the nut 60 is tightened or loosened. With the upstream flow guide in place, a pair of the resilient members 54 and one of the inner screen supports 52 are placed on its inwardly projecting portion 46e. The inner screen, with a pre-filtration element if one is to be used, are positioned on the support. The second inner screen support is then placed on the other end of the inner screen and the pre-filtration element. A second pair of resilient members 54 is placed against the flange of the second inner screen support while the downstream fluid guide is threaded on to the end portion 56d of the rod. The tightening of the downstream fluid guide 58 secures all of the parts thus assembled in the desired relationship. The assembly 44 is then inserted within the filtration element 18 through the upstream end of the housing until the flange 46d abuts the end portion 26 of the housing. This relationship automatically positions each pair of resilient members on opposite sides of the junctions 24. The ends of the filtration element are impregnated to a preselected depth to ensure this alignment.

With the assembly 44 thus positioned, the nut 60 is tightened, preferably with a torque wrench, and this results in the desired deformation of the resilient members 54 to seal the filtration element to the housing. Finally, the vent valve 72 is threaded into the downstream fluid guide and the inlet conduit 62 is secured to the upstream fluid guide by the clamp 66.

In operation, unfiltered fluid is introduced into the conduit 62 under an applied pressure typically in the range of 45-55 psi, with a maximum pressure of approximately 100 psi. The fluid flows through the passages 68 between the fluid guide 48 and the adapter 58 to the interior of the assembly 44. It then flows in a generally radial, inside-to-outside direction through a prefiltration element (if one is used), the inner screen 50, the filtration element 18, and the outer screen 16 to the downstream reservoir chamber 38 and from there, through the outlet conduit 40. After passing through the filtration element, the unfiltered fluid is filtered, and if a proper grade of microporous filtration material is selected, the filtered fluid is sterile. It can readily be seen that the described filtration system also reliably isolates the filtered fluid from contamination once it reaches the reservoir chamber 38.

After operating for a given period of time, the contaminants removed from the fluid begin to accumulate and clog the upstream side of the microporous filtration element. When the filtration element is thus clogged to an unacceptable degree, it is easily replaced by removing the inlet conduit 62, loosening the nut 60, and sliding the assembly 44 out of the housing. The filtration element 18 may then be removed and a fresh element reinserted and sealed in place.

A significant advantage of the invention is that the filtration system is in-line steam sterilizable, that is, it may be sterilized in place by introducing steam at temperatures in excess of 121° C and pressures in excess of 15 psi, as opposed to completely disassembling the system, autoclaving it, and reassembling the parts under aseptic conditions. In-line steam sterilization is possible with the filtration system disclosed herein, but is generally not possible with prior art devices. The filtration system of this invention allows for the wet growth of the microporous filtration material and provides adequate downstream support for the filtration element in the context of an inside-to-outside fluid flow direction that does not wrinkle or otherwise stress the microporous filtration layer. Further, the structural features of the invention allow the use of materials approved by the United States Food and Drug Administration for the processing of foods and drugs. In particular, the structural members described can all be readily fashioned from stainless steel.

Still further, there has been described a filtration system which is readily assembled and disassembled, whether broken down into its component parts for a thorough cleaning and autoclaving, or into major assemblies or groups of parts for the convenient replacement of the filtration element. Also, the assembly and disassembly result in a reliable sealing of the filtration element without requiring a high degree of skill in the operator.

Having thus described the preferred embodiment of the invention, what is claimed is:

1. A holder for a fragile tubular filter element for filtering liquid, comprising a housing that is formed with a generally cylindrical bore that provides a chamber, said housing being formed with an opening communicating with said chamber to provide a passage for liquid flow therethrough, a subassembly that is insertable in said bore, that can function to provide a fragile filter element mounting means when a fragile filter element is mounted thereon prior to insertion thereof into said bore, said subassembly including means providing a liquid passage communicating with the interior of said subassembly to provide a passage for liquid on the opposite flow side of a filter element from said first-named passage, said subassembly also including means for supporting a fragile tubular filter element against hydraulic pressure applied in all directions thereto, said support means being dimensioned to support a filter element that is expanded when in use and wet, said subassembly further comprising seal means actuatable to form a resilient seal at each end of the housing bore and of the subassembly adjacent the positions for the ends of a fragile tubular filter element, respectively, for sealing the subassembly to the housing in fluid-tight, operative engagement, and for sealing a fragile filter element across the upstream-downstream path, said seal means, when actuated to form a resilient seal, also serving to secure the subassembly within the bore of the housing, and means for actuating said seal means after said filter element mounting means is inserted into said housing.

2. A holder in accordance with claim 1 wherein said means for actuating said seal means is carried on said subassembly.

3. A filter consisting of a holder in accordance with claim 1 and a deformable, tubular filter element mounted in said subassembly, said seal means when actuated to form a resilient seal, completing a seal between the ends of the filter element and the housing.

4. A holder for a fragile tubular filter element for filtering liquid, comprising a housing that is formed with a generally cylindrical bore that provides a chamber, said housing being formed with an opening communicating with said chamber to provide a passage for fluid flow therethrough, a subassembly that is insertable in said bore, that can function to provide a fragile filter element mounting means when a fragile filter element is mounted thereon prior to insertion thereof into said bore, said subassembly comprising a pair of members that are disposed to be engageable in the opposite ends of the bore of the housing, respectively, and said subassembly including means providing a liquid passage communicating with the interior of said subassembly to provide a passage for liquid on the opposite flow side of a filter element from said first-named passage, said subassembly also comprising:

a pair of support rings that are mounted at the opposite ends of the subassembly, respectively, each being movable relative to the member at its respective end of the subassembly, a first, rigid foraminous tube that is engaged at its ends against, and that is supported on, said support rings, and that are adapted to support a fragile tubular filter element against hydraulic pressure, resilient, deformable seal means interposed between said support rings and said members respectively, means for adjusting the position of said members relative to each other after said filter element mounting means is inserted into said housing to cause deformation of said seal means, thereby to actuate said seal means to form a resilient seal at each end of the housing bore and of the subassembly adjacent the positions for the ends of a fragile tubular filter element, respectively, for sealing the subassembly to the housing in fluid-tight, operative engagement, and for sealing a fragile filter element across an upstream-downstream fluid flow path, said seal means, when actuated to form a resilient seal, also serving to secure the subassembly within the bore of the housing, and a second rigid, foraminous tube that is disposed in each chamber to support the fragile filter element against hyrdaulic pressure in the opposite direction from that for which said first tube provides support, said second tube being dimensioned to accomodate any expansion of the filter element when wet.

5. A holder in accordance with claim 4 wherein the holder is constructed of materials permitting in-place steam sterilization.

6. A holder in accordance with claim 4, wherein the second rigid, foraminous tube is disposed in nested relation about said first-mentioned tube, with clearance therebetween to receive a tubular filter element therebetween, providing hydraulic support for the filter element in both upstream and downstream directions.

7. A holder in accordance with claim 6 for liquid flow from inside the subassembly into the chamber, and wherein the outer foraminous tube is dimensioned to provide operating support for a tubular filter element that expands when wet in use.

8. A filter comprising a filter holder in accordance with claim 4 and a fragile, deformable tubular filter element that expands when in use and wet, mounted on said subassembly, said resilient, deformable gasket means being actuatable upon deformation to complete a resilient seal between the ends of the tubular filter element, respectively, and the housing, for sealing the filter element and the subassembly to the housing in fluid-tight, operative engagement.

9. A holder for a fragile tubular element for filtering liquid comprising
a housing that is formed with a generally cylindrical bore that provides a chamber,
said housing being formed with an opening communicating with said chamber to provide a passage for liquid flow therethrough,
a subassembly that is insertable in said bore and that can function to provide a fragile filter element mounting means when a fragile filter element is mounted thereon prior to insertion thereof into said bore, said subassembly comprising a pair of end members that are disposed to be engageable in the opposite ends of the bore of said housing, respectively, said subassembly including means providing a liquid passage communicating with the interior of said subassembly to be on the opposite flow side of a filter element from the first-named passage,
said subassembly also comprising:
a pair of support rings that are mounted at opposite ends of the subassembly, respectively, each being disposed for sliding movement relative to the end member at its respective end of the subassembly,
a first rigid, foraminous tube that is engaged at its ends against, and that is supported on, said support rings, and that is adapted to support a fragile tubular filter element against hydraulic pressure applied in one direction,
resilient, deformable gasket means interposed between said support rings and said end members respectively,
a rigid member interconnecting said end members,
means carried on said rigid member for adjusting the position of said end members relative to each other when the subassembly is inserted in the bore, to cause deformation of said gasket means by compression between the end members and the support rings respectively,
said gasket means being deformable to form a resilient seal at each end of the housing bore of the subassembly respectively, adjacent the position for the ends of a fragile tubular filter element respectively, for sealing the subassembly of each of its ends within the bore of the housing in fluid-tight, operative engagement, respectively, and for sealing a filter element across an upstream-downstream path, said gasket means, when deformed, also serving as the means to secure the subassembly within the bore of the housing, and
a second rigid, foraminous tube that is disposed in said chamber to support the filter element against hydraulic pressure in the opposite direction from that for which said first tube provides support, said second tube being dimensioned to accomodate expansion of filter element when in use and wet.

10. A holder in accordance with claim 9 wherein one of said end members is formed with a threaded bore, and the rigid member that interconnects the end members is threaded into said bore of said one end member, and said one end member is formed with vent means providing communication between its threaded bore and the exterior, and said one end member is provided with means for closing said vent means.

11. A holder in accordance with claim 9 wherein said resilient gasket means comprises at least one O-ring disposed at each end of the subassembly.

12. A holder in accordance with claim 9 wherein said resilient gasket means comprises at least two O-rings disposed at each end of the subassembly, respectively.

13. A filter comprising a holder in accordance with claim 9 and a deformable, fragile tubular filter element, that expands when in use, mounted about said first tube and nested within said second tube, with its end projecting beyond the ends of the tubes, said gasket means being actuable upon deformation to form resilient seals that complete a seal between the ends of the filter element, respectively, and the housing wall, for sealing the filter element and subassembly in the housing in fluid-tight engagement.

14. A holder for a fragile tubular filter element for filtering a liquid comprising
a housing that is formed with a generally cylindrical bore that provides a chamber,
said housing having a wall bounding said chamber, said housing being formed with an outlet opening communicating with said chamber to permit liquid discharge therefrom,
a subassembly that is insertable in said bore, that can function to provide a fragile filter element mounting means to support a filter element mounted thereon for insertion in said bore, said subassembly comprising a pair of end members that are disposed to be engageable in the opposite ends of the bore of said housing respectively,
said subassembly further comprising:
a pair of support rings that are mounted at opposite ends of the subassembly, respectively, each being disposed for sliding movement relative to the end member at its respective end of the subassembly,
at least one rigid, foraminous tube that is engaged at its ends against, and that is supported on, said support rings, and that prevents these rings from moving toward each other, and that is adapted to support a fragile tubular filter element thereon against hydraulic pressure applied in an upstream direction, resilient, deformable gasket means interposed between said support rings and said end members respectively, means for adjusting the position of said end members relative to each other when the subassembly is inserted in the bore, to cause deformation of said gasket means, to activate said gasket means to form a resilient seal at each end of the housing bore and of the subassembly respectively, adjacent the positions for the ends of a tubular filter element, respectively, for sealing the subassembly at each of its ends respectively within the bore of the housing and for completing a seal to said housing wall in fluid-tight, operative engagement, respectively, for sealing a fragile filter element across an upstream-downstream liquid flow path, and for securing the subassembly within the housing, said subassembly including means in one of said end members providing a liquid inlet that communicates with the interior of said subassembly to permit the passage of liquid through said foraminous tube, the other of said end members being formed so that, when the subassembly is sealed in operative position, its end of the housing bore is closed, and a second, rigid, foraminous tube that is disposed within the housing bore in nested relation about said first-mentioned tube, with clearance therebetween to receive a fragile tubular filter element therebetween, said second tube providing hydraulic support for the filter element in the downstream direction and being dimensioned to provide operating support for a fragile tubular filter element that is expanded when in use and wet.

15. A holder in accordance with claim 14 wherein said means for adjusting the position of the end members includes a rod member that interconnects the said end members and a threadably adjustable nut carried by the rod member for engagement against one of said end members.

16. A filter comprising a filter holder in accordance with claim 14 and a fragile deformable tubular filter element, that expands when in use and wet, mounted on said subassembly, the filter element being disposed in said chamber in operative position to filter fluid, with its ends projecting beyond the ends of the tubes, said element being mounted on said first rigid foraminous tube to permit the tube to support the filter element against hydraulic pressure, and within said second rigid foraminous tube, said second rigid tube being dimensioned to support the filter element against hydraulic pressure in its expanded state when in use and wet.

17. A filter in accordance with claim 16 wherein the tubular filter element is impregnated at each of its ends, and wherein said resilient gasket means are disposed to engage over each side of the interface at each end of the filter element, respectively, between the impregnated and unimpregnated zones of the filter element.

18. A filter in accordance with claim 16 wherein the filter holder and filter element are constructed from materials that permit in-place steam sterilization.

19. A filter comprising a holder and a fragile, deformable, tubular filter element comprising a housing that is formed with a generally cylindrical bore that provides a chamber, said housing being formed with an outlet opening communicating with said chamber to permit liquid discharge therefrom, a subassembly that is inserted in said bore, a fragile, deformable, tubular filter element, that expands when in use and wet, disposed on said subassembly and disposed in said chamber in operative position to filter liquid, said subassembly comprising:

a pair of end members that are engaged in the opposite ends of the bore of said housing, respectively, a pair of support rings that are mounted at opposite ends of the subassembly, respectively, each being disposed for sliding movement relative to the end member at its respective end of the subassembly, a first rigid, foraminous tube that is engaged at its ends against, and that is supported on, said support rings, to prevent the rings from moving toward each other, said tube being nested within the fragile filter element and disposed to support the filter element thereon against hydraulic pressure, a second, rigid, foraminous tube that is disposed about said first tube and the filter element, with clearance between the tube and the filter element to permit the second tube to provide hydraulic support for the fragile filter element when in use, the ends of the filter element projecting beyond the ends of the tubes, resilient, deformable gasket means interposed between said support rings and said end members respectively, means for adjusting the position of said end members relative to each other when the subassembly is inserted in the bore, to cause deformation of said gasket means, to activate said gasket means to form a resilient seal at each end of the housing bore and of the subassembly respectively, to seal the ends of the fragile tubular filter element, respectively, and of the subassembly at each of its ends respectively within the bore of the housing in fluid-tight, operative engagement, sealing the filter across an upstream-downstream liquid flow path, said gasket means also serving, when deformed, to seal the subassembly in the bore, to secure the subassembly in the bore, said subassembly including means in one of said end members providing a liquid inlet that communicates with the interior of said subassembly to permit the passage of liquid through said foraminous tube and the filter element, and the other of said end members being formed so that, when the subassembly is sealed in operative position, its end of the housing bore is closed.

20. A filter in accordance with claim 19 wherein said means for adjusting the position of the end members includes a rod that interconnects the said end members and a threadably adjustable nut carried by the rod for engagement against one of said end members.

21. A filter in accordance with claim 19 wherein the ends of said fragile filter element are impregnated, and said gasket means are disposed to engage each end of the filter element respectively, on each side of the interface between its impregnated and non-impregnated parts.

* * * * *